Feb. 1, 1949.                B. WALLS                2,460,374
                    AIRCRAFT FLIGHT CONTROL SYSTEM
                         Filed Oct. 21, 1947
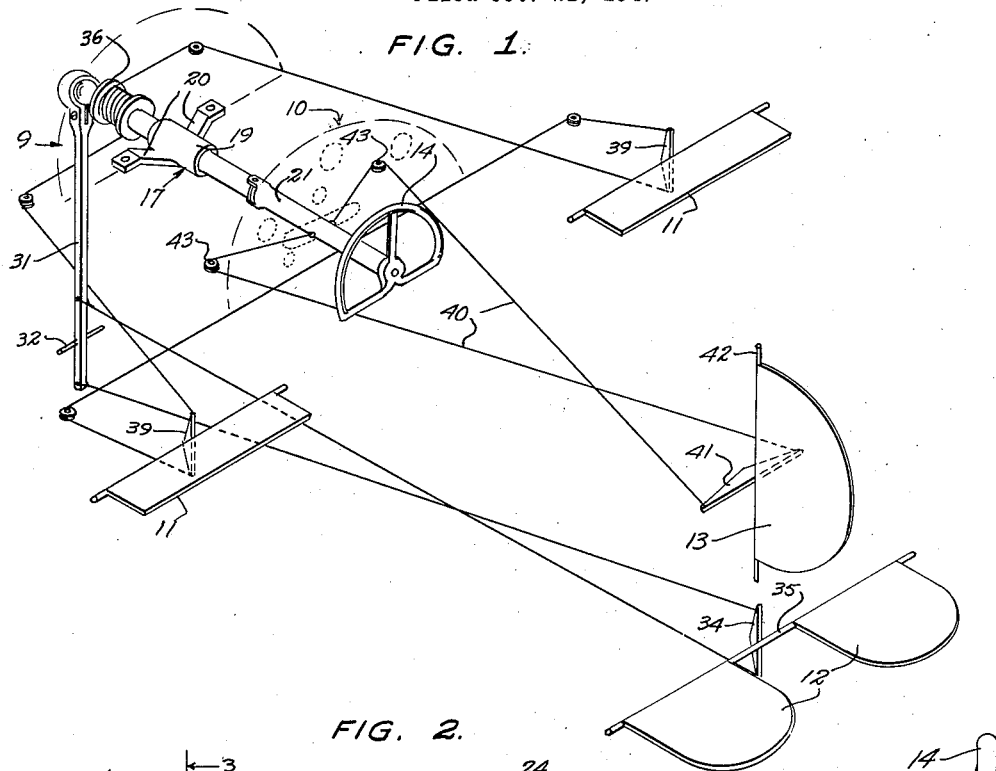
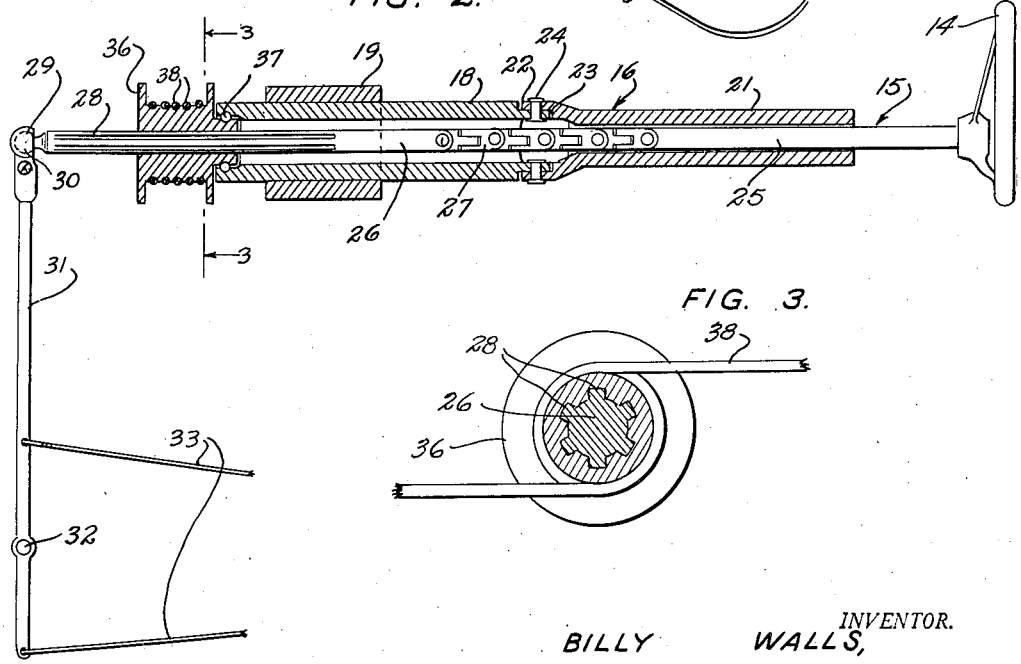
INVENTOR.
BILLY WALLS,
BY
McMorrow, Berman & Davidson
ATTORNEYS.

Patented Feb. 1, 1949

2,460,374

UNITED STATES PATENT OFFICE 2,460,374

AIRCRAFT FLIGHT CONTROL SYSTEM

Billy Walls, Colonie, Italy; C. M. Walls administrator of said Billy Walls, deceased Application October 21, 1947, Serial No. 781,214

2 Claims. (Cl. 244—83)

This invention relates to improvements in aircraft flight control systems, and more particularly to a flight control system wherein manually operated control means are operatively connected with the aircraft flight control surfaces such as the ailerons, elevators and rudder.

It is among the objects of the invention to provide an improved flight control system wherein all of the flight control functions are accomplished by manual operation of a single control element, such as a hand wheel, which system is simple in arrangement, requires no gears or similarly expensive parts, is positive in operation, is reversible in all movements to retain the control "feel" whereby the pilot subconsciously perfects the adjustment of the various control surfaces of the aircraft, is highly sensitive and operates without substantial friction, and is of generally simple, durable and economical construction.

A somewhat more specific object resides in the provision of an improved and simplified aircraft flight control system in which all of the flight control functions are accomplished by a single hand wheel or similar device, omitting the conventional foot controlled rudder bar and leaving the pilot's feet free for operation of wheel brakes or other devices.

Other objects and advantages will become apparent from a consideration of the following description in conjunction with the accompanying drawings, wherein:

Figure 1 is a diagrammatic perspective view of a controlled system illustrative of the invention.

Figure 2 is a longitudinal cross-sectional view of the control mechanism.

Figure 3 is a transverse cross-section taken substantially on the line 3—3 of Figure 2.

With continued reference to the drawings, the aircraft, diagrammatically represented by the bulkhead 9 and panel board or dash 10, has a pair of ailerons 11, a pair of elevators 12 and a rudder 13. In conventional control systems the ailerons and elevators are moved by a manually operated control column and the rudder is moved by a foot-operated rudder bar making it necessary for the pilot to use at least one hand and both feet for the flight control of the aircraft, the other hand being normally occupied with power plant controls. This is at times highly inconvenient, particularly when it is necessary for the pilot to selectively operate the wheel brakes of the aircraft or actuate the landing gear mechanism. With the present arrangement all of the flight control functions are performed by a single manually operated element, such as the steering or hand wheel 14 leaving the pilot's feet free for operating the brakes and other devices.

In the illustrated arrangement the hand wheel 14 is mounted upon the inner end of a shaft assembly, generally indicated at 15 which extends through and is longitudinally slidable and rotatable in a tube or column assembly, generally indicated at 16, fixed to the aircraft structure 10 by means of a bracket, generally indicated at 17.

The tube or column assembly 16 comprises a cylindrical sleeve 18 which is received in a tubular portion 19 of the bracket 17 which tubular portion of the bracket is secured to the aircraft structure by a pair of oppositely extending apertured arms 20. This bracket firmly secures the sleeve to the aircraft structure in fixed position relative thereto. The sleeve 18 is mounted in a generally horizontal position with its longitudinal axis generally parallel to the longitudinal axis of the aircraft and a tubular extension 21 is positioned at the inner end of the sleeve and pivotally connected thereto for movement relative to the sleeve about a substantially vertical axis. The pivotal connection between the sleeve and the tubular extension 21 may conveniently comprise overlapping apertured lugs 22 and 23 provided on the extension and the sleeve respectively and a pair of diametrically opposed pivot pins 24 extending through these apertured lugs.

The shaft assembly 15 comprises a pair of shaft sections 25 and 26 disposed in end-to-end relationship in the tube assembly 16 and interconnected by a flexible connection 27 which extends past the pivotal connection between the sleeve 18 and the tubular extension 21.

The outer end portion of shaft section 26 is longitudinally splined, as indicated at 28, and the extreme outer end of this shaft section is provided with a ball 29 constituting the inner element of a ball and socket universal connection 30 by means of which the upper end of an elevator bar 31 is operatively connected to the outer end of the shaft assembly. The bar 31 is pivotally connected adjacent its lower end to the aircraft structure by a pivot pin 32 and is operatively connected at equal distances on opposite sides of this pivot pin by suitable strands or cables 33 with the opposite ends of the elevator arm 34 connected at its mid-length position to the mid-length portion of the elevator supporting rod 35.

With this arrangement translational movement of the hand wheel 14 in a fore and aft direction, moving the shaft assembly 15 longitudinally through the tube assembly 16 will tilt the elevator bar 31 about its pivotal mounting 32 and impart control movements to the aircraft elevators 12.

A drum 36 is journaled on the outer end of the sleeve 18 by a suitable anti-friction bearing 37 which restrains the drum against movement longitudinally of the sleeve and is provided with an internally splined axial bore receiving the splined end portion 28 of shaft 26, and is clearly illustrated in Figure 3, so that shaft section 26 is slidable through the drum but is effective to rotate the drum upon rotation of the hand wheel 14. A cable 38 is wound upon the drum 36 and operatively connected at its ends to the arms 39 secured to the ailerons 11. With this arrangement rotation of the hand wheel 14, by rotating drum 36, is effective to move the ailerons 11 for rolling control of the aircraft.

A pair of cables 40 are each connected at one end to a respective end of the rudder arm 41 which turns the rudder about the rudder post 42 and are connected at their opposite ends to the tubular extension 21 of the tube assembly 16, passing over suitable fixed sheaves 43 secured to the aircraft structure at positions laterally spaced from the extension 21.

With this arrangement lateral swinging movement of the hand wheel 14 about the pivotal connection in the tube assembly will pull on the cables 40 in a manner to impart flight controlling movement to the rudder 13. Preferably, the cables 40 are crossed over, as illustrated in Figure 1, so that the aircraft will turn in the same direction in which the hand wheel 14 is moved.

The flexible connection 27 may conveniently comprise a series of pivotally interconnected links, as clearly illustrated in Figure 2, and is effective to connect the sections 25 and 26 of the shaft assembly so that the shaft assembly can be rotated and also moved lengthwise through the tube assembly regardless of the angular position of the tube extension 21 relative to the sleeve 18.

The invention may be embodied in other specific forms without departing from the spirit or essential characteristics thereof. The present embodiment is therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A flight control system for an aircraft having ailerons, elevators and a rudder, said system comprising a tubular sleeve, means securing said sleeve to the aircraft against movement relative thereto and in a substantially horizontal, fore and aft position, a tubular extension projection from the inner end of said sleeve, a pivotal connection securing said extension to the inner end of said sleeve for movement about a substantially vertical axis, a shaft slidable and rotatable in said extension, a hand wheel on the inner end of said shaft, a shaft slidable and rotatable in said sleeve and having a splined end portion remote from said tubular extension, a flexible connection between adjacent ends of said shafts extending past said pivotal connection between said sleeve and said extension, a drum journaled on the end of said sleeve opposite said extension and having an internally splined bore slidably receiving said splined shaft for rotation thereof by said hand wheel, a cable wound on said drum and operatively connected with the ailerons of said aircraft, a vertical bar depending from the outer end of said splined shaft and pivotally secured adjacent its lower end to said aircraft for back and forward tilting movement upon movement of said hand wheel toward and away from said tubular extension, cables operatively connecting said bar to the elevators of said aircraft, and a pair of cables each connected at one end to said rudder and at its opposite end to said tubular extension intermediate the length of said extension to turn said rudder upon movement of said tubular extension by said hand wheel about the pivotal connection between said tubular extension and said sleeve.

2. A flight control system for an aircraft having ailerons, elevators and a rudder, said system comprising a fixed tubular sleeve, a tubular extension at one end of said sleeve secured to said sleeve for movement about an axis extending diametrically of said sleeve end, respective shafts slidably and rotatably mounted in said sleeve and said extension, a flexible connection between said shafts extending past the pivotal connections between said sleeve and said extension, a drum journaled on the end of said sleeve opposite said extension, a hand wheel on the extension included shaft at the end of said extension opposite said sleeve, a spline connection between said sleeve included shaft and said drum whereby said shaft is slidable through said drum and is effective to rotate the same upon rotation of said hand wheel, an operative connection between said drum and said ailerons, an operative connection between the end of said sleeve included shaft opposite said extension and said elevators, and an operative connection between said tubular extension and said rudder.

BILLY WALLS.

REFERENCES CITED

The following references are of record in the file of this patent:

UNITED STATES PATENTS

| Number | Name | Date |
|--------|------|------|
| 1,900,068 | Mueller | Mar. 7, 1933 |
| 2,046,570 | Malinowski | July 7, 1936 |
| 2,398,601 | Seifert | Apr. 16, 1946 |

FOREIGN PATENTS

| Number | Country | Date |
|--------|---------|------|
| 3,438 | Great Britain | 1910 |